United States Patent Office 3,690,961
Patented Sept. 12, 1972

3,690,961
METHOD FOR PRODUCING COMPOSITE ARTICLE
Aurel I. Berghezan, Rhode-St.-Genese, Belgium, assignor to Cabot Corporation
Original application Dec. 6, 1967, Ser. No. 688,945. Divided and this application Jan. 23, 1970, Ser. No. 8,759
Int. Cl. C21d
U.S. Cl. 148—11.5 F  1 Claim

ABSTRACT OF THE DISCLOSURE

A nickel-aluminum composite metallic material produced from nickel and aluminum powders characterized by high strength throughout a wide range of temperatures and having excellent resistance to oxidation at elevated temperatures.

This application is a division of Ser. No. 688,945, filed Dec. 6, 1967, now abandoned.

This invention relates to a metallic composite material having high strength throughout a wide range of temperatures and having excellent resistance to oxidation at elevated temperatures. More particularly, the present invention is directed to the making of a composite nickel-aluminum article characterized by having a highly uniform, fibrous microstructure.

At the present time, there are many industrial applications which require the use of materials which exhibit high strength over a wide temperature range, i.e., both at low and very high temperatures and which are also highly resistant to oxidation. The so-called "super-alloys" have been proposed for these applications and while these "super-alloys" have otherwise high utility, they are known to exhibit a sharp drop in strength at high temperatures, e.g. at 800–1000° C. Various composite metal articles formed from fine metal particles and inert dispersoids have also been proposed for such applications. However, these materials, while showing promise at high temperature operation, have been found to have relatively low strength at low and intermediate temperatures in the range of about 20° C. to 800° C.

It is therefore an object of the present invention to provide an oxidation resistant metallic composite material which is characterized by high strength at both low temperatures and at elevated temperatures up to 1000° C. and higher and which also are characterized by increased ductility with temperature.

Other objects will be apparent from the following description and claim taken in conjunction with the drawing in which:

Figure 3A:
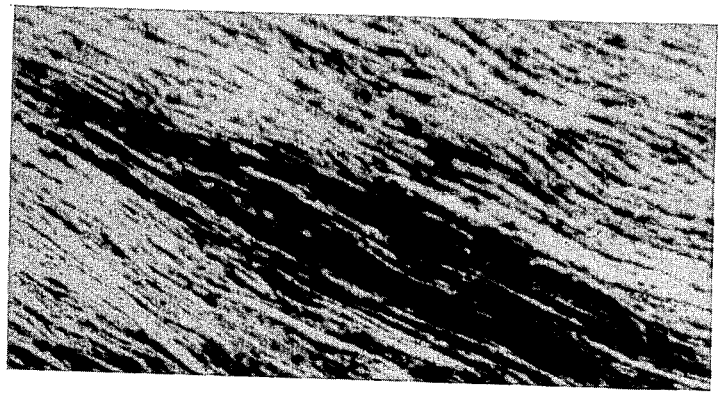
Figure 3B:
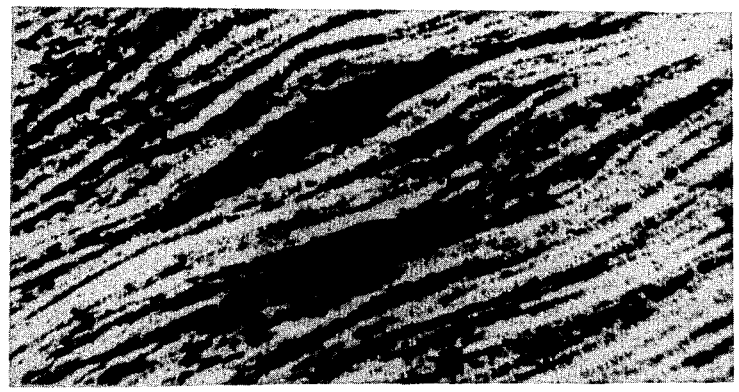
Figure 4A:
Figure 4B:

FIGS. 3(a) and 3(b) show at magnification of 200× and 500× respectively, the microstructure of material FIGS. 4(a) and 4(b), show at magnification of 500× and 200×, respectively, the fibrous structure of material of the present invention after etching in acid.

Figure 5:
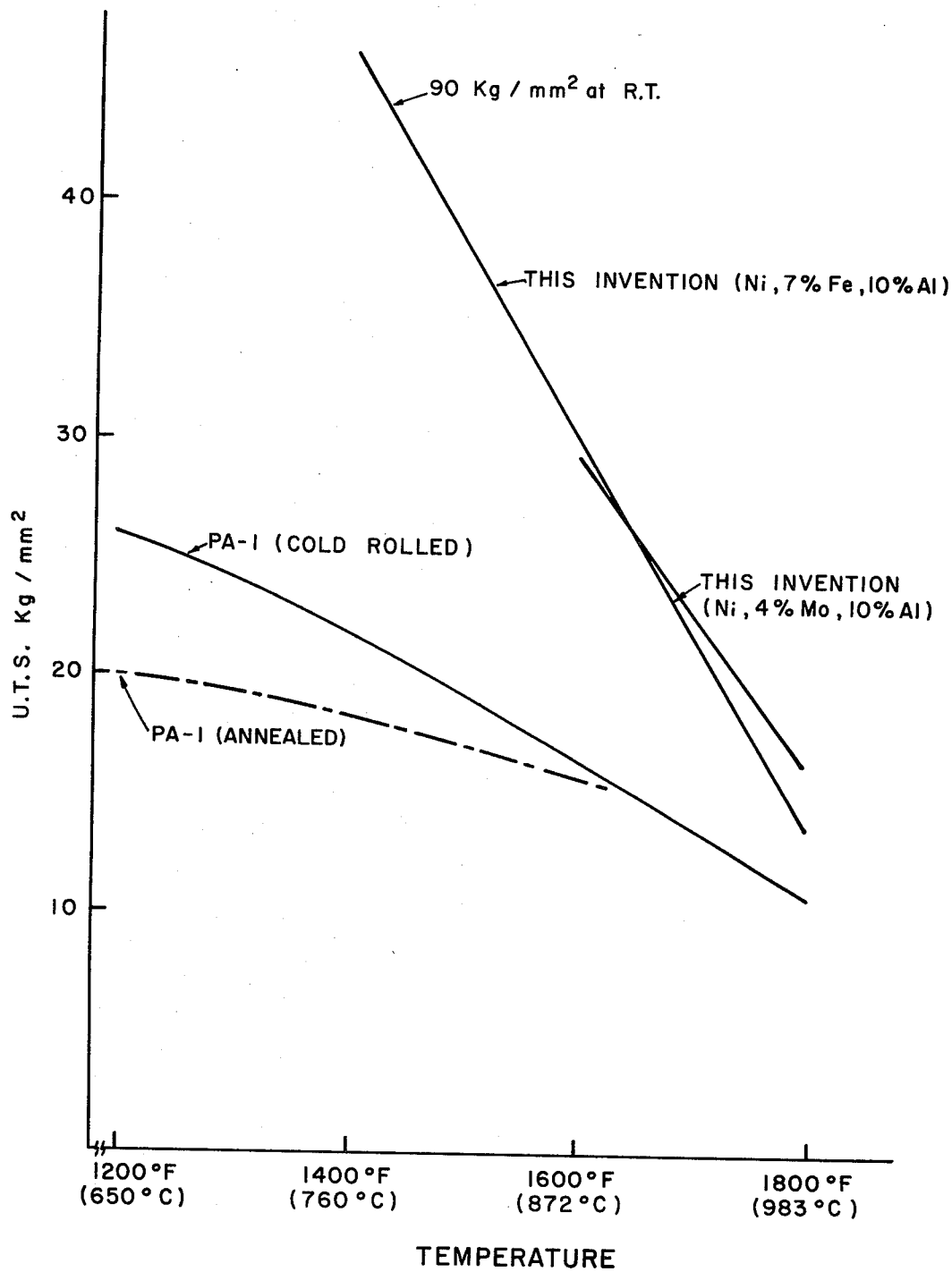
Figures 6A, 6B:
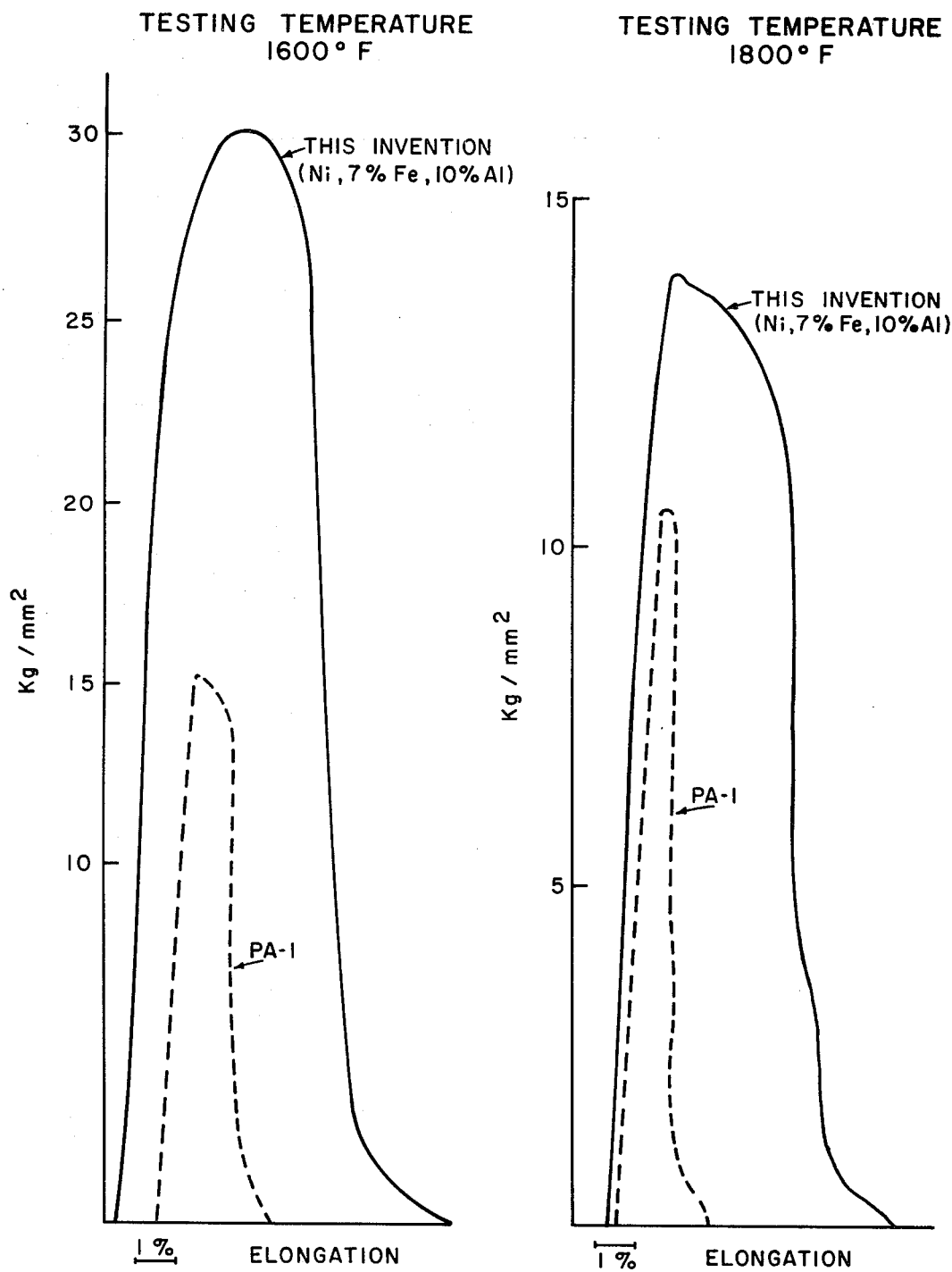

FIG. 5 shows comparatively the improved strength properties of the material of the present invention and FIGS. 6(a) and 6(b) show, comparatively, the increased ductility of the material of the present invention with increasing temperature.

In one embodiment, the present invention involves a method for producing a high strength and oxidation resistant composite metallic article which comprises blending finely divided elemental nickel powder with from about 2 to about 20% by weight of finely divided elemental aluminum powder; subjecting the thus blended elemental nickel and elemental aluminum powders to a compacting and deforming pressure sufficient to produce a coherent compact comprising particles of elemental nickel and elemental aluminum, substantially all of which particles have been substantially elongated as a result of the applied compacting and deforming pressure; heating the thus formed compact to a temperature sufficient to initiate a self-sustaining exothermic reaction throughout substantially the entire compact to provide a reaction product predominantly in the form of interlocked polycrystalline fiber-like material; and hot-working the thus obtained material at a temperature in the range of about 900–1350° C. to obtain a reduction in thickness of at least 80% and, produce a nickel base material, the predominant portion of which is in the form of a discontinuous, fiber-like, interlocked polycrystalline structure in which is present a solid solution of aluminum in nickel, and $Ni_3Al$, a portion of the $Ni_3Al$ being present as a dispersed precipitate.

The aforedescribed compacting and deforming step results in increased contact surface between the elemental nickel and elemental aluminum constituents, improves the uniformity of the mixture, and eliminates large clusters of particles by breaking up local concentrations of nickel and aluminum which are inherently present before and after compacting in spite of careful blending. Also, extensive elongation, i.e., fibrilization of the nickel and aluminum is achieved due to the heavy deformation during this step of the process. That is to say, after the compacting and deforming step, practically all of the aluminum and nickel are present as fiber-like phases which have one cross-sectional dimension more than twice the other.

In the practice of the present invention finely divided elemental nickel powder, for example, sized 1 to 10 microns and preferably sized 2–5 microns is blended with finely divided elemental aluminum powder, sized about 1 to 150 microns and preferably sized about 10 to 25 microns.

The proportion of aluminum to nickel is in the range of about 2% to 20% preferably in the range of 8% to 13%, in order to enable the ultimate formation of both an $Ni_3Al$ phase and a solid solution of nickel in aluminum in the composite article during treatment subsequent to compacting as hereinafter more fully described.

Figure 1:
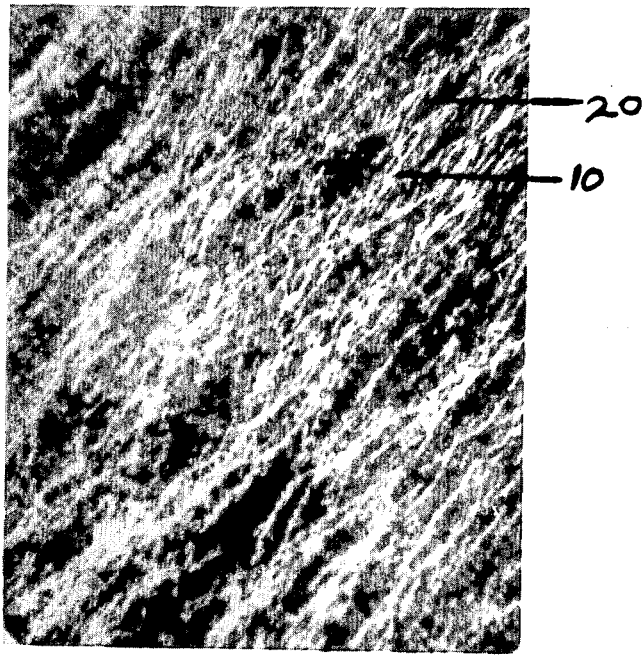
FIG. 1 is a photomicrograph (original magnification 600×) of elemental aluminum and elemental nickel which has been compacted and extensively deformed following the practice of the present invention.

The mixing of the elemental nickel and aluminum powders can be suitably accomplished using standard blending techniques after which the nickel-aluminum mixture is compacted and extensively cold deformed to form a solid, self-supporting and coherent shape which has a fibrous or lamellar structure. After this treatment, the compact has a density which is in the range of about 50 to 90% of the maximum theoretical density obtainable by melting and solidifying the Al-Ni mixture. Extrusion or swaging, to provide a compact having a density of about 80% of theoretical is the preferred compacting procedure. The compacting step is performed at a pressure and temperature such that the resultant compact is in the form of a coherent shape of unreacted elemental nickel and elemental aluminum particles substantially all of which particles have been elongated and reduced in thickness by virtue of the compacting and deforming pressure. That is to say, the elemental particles of both nickel and aluminum, being ductile, are deformed by the applied pressure, from their initial generally spherical or equi-dimensional shape into fiber-like form. FIG. 1 of the drawing shows a photomicrograph (original magnification 600×) of a compact prepared by pressing in a die a blended mixture of elemental nickel and elemental aluminum powder at a pressure of about 40 tons per square inch and then rolling to 85% reduction. The dimensions of the compact were 800 mm. x 500 mm. x 4 mm. The nickel powder, 90% by weight, was initially sized about 1 to 10 microns and the aluminum powder, 10% by weight was initially sized 1 to 150 microns. With reference to FIG. 1, the numeral 10 indicates fiber-like elemental aluminum material which appears as a whitish phase and 20 indicates the fiber-like elemental nickel which appears as the darker phase in the photomicrograph.

The compact thus obtained was heated to an elevated temperature in order to cause an exothermic self-sustaining reaction throughout substantially the entire body between the compact constituents and resulted in the production of a material having a micro-structure predominantly in the form of interlocked polycrystalline, fiber-like material.

On sheet samples, the exothermic reaction is optically visible and exhibits a red heat flow which rapidly spreads throughout the compact. A suitable reaction initiating temperatures is from about 600° C. to 1000° C. The reaction product material retains the substantially uniform fiber-like structure which was initially imparted to the material during the prior compacting and deformation procedure.

Figure 2:
FIG. 2 is a photomicrograph (original magnification 600×) of material of the type of FIG. 1 after being subjected to reaction following the practice of the present invention.

FIG. 2 of the drawing shows a photomicrograph (original magnification 600×) of the compact of the type of FIG. 1 after having been heated to 800° C. and having undergone the self-sustaining exothermic reaction as above mentioned. The characteristic polycrystalline fiber-like micro-structure of the reaction product is seen in FIG. 2.

The above-noted reaction product is subsequently subjected to hot-working for example by hot-rolling to achieve in the material a density of at least 97% of the maximum theoretical density which would be obtained based on complete melting and solidification of the Ni and Al constituents. In the course of this hot-working step, temperatures in the range of 900° C. to 1350° C. are employed causing a small portion of aluminum to dissolve in the nickel matrix and subsequently precipitate as a dispersed $Ni_3Al$ precipitate. However, hot-working schedules at which substantially recrystallization of the reaction product occurs are to be avoided in order to be able to conserve the initial fiber-like structure developed during the previous steps and to permit an increase in "fibering" in the material.

Upon completion of this hot-working step, the composite material is predominantly in the form of a discontinuous, fiber-like interlocked polycrystalline structure consisting essentially of a solid solution of aluminum in nickel together with $Ni_3Al$, a portion of the $Ni_3Al$ being present as a dispersed precipitate. The $Ni_3Al$ can be present in the order or disordered state. In addition, it may also contain a fine, uniform dispersion of $Al_2O_3$ and NiAl at the higher aluminum contents.

With reference to the drawing, FIG. 3(a) is a photomicrograph (original magnification 200×) which shows the discontinuous fiber-like polycrystalline structure of the product material of this invention produced in the manner described above and FIG. 3(b) shows the same material at a magnification of 500×. FIG. 4(a) is a photomicrograph (original magnification 500×) of the acid etched material of the present invention which shows at 30 a typical interlock of the different $Ni_3Al$ and solid solution phases in the discontinuous fiber-like structure of the material of the present invention and FIG. 4(b) shows similar material at a magnification of 200×. The numeral 40 in FIG. 4(a) points out the marks resulting from microhardness testing of the material which shows the existence of two distinct phases in the material. The presence of a solid solution of aluminum in nickel, $Ni_3Al$ and dispersed $Ni_3Al$ precipitate in the material can be shown by standard X-ray analysis techniques.

By virtue of the above-described characteristic interlocked polycrystalline structure, the presence of a solid solution of aluminum in nickel, and dispersed $Ni_3Al$ precipitate, the material produced exhibits high strength and improved oxidation resistance as shown hereinbelow.

Thus this invention provides a straightforward uncomplicated procedure for imparting to a material several different strengthening mechanisms, viz discontinuous fibrous mechanical reinforcement, solution strengthening, precipitation strengthening, and dispersion strengthening. Additionally, enhanced dispersion strengthening can be readily provided in addition, as hereinafter described. The material of this invention, as a result, is characterized by excellent strength properties throughout a remarkably wide range of temperatures as hereinafter illustrated.

The following examples will further illustrate the present invention.

EXAMPLE

Elemental nickel powder sized from 1 to 10 microns and elemental aluminum powder sized 1 to 150 microns were blended in proportions of 90% by weight Ni and 10% by weight Al. The blended material was compacted in a die at a pressure of 40 tons per square inch to provide a coherent self-supporting compact 100 cm. long and having a diameter of 25 mm. The compact was then cold-rolled, in a stainless steel can, to a thickness of 4 mm. The micro-structure of the material showed a fiber-like arrangement of elemental nickel and aluminum similar to that of FIG. 1.

The cold-rolled compact was then heated in air to 1000° C. and a self-sustaining, exothermic raeaction, evidenced by red heat, was initiated and spread throughout the entire compact and was completed in about 2 seconds. The micro-structure of the reaction product showed a polycrystalline fiber-like structure such as is illustrated in FIG. 2. The compact, after reaction, had substantially the same size and shape as before.

The reaction product was then subjected to hot working whereby it was gradually reduced in thickness by about 90% to about 0.4 mm.

The hot working schedule was as follows:

(a) Heat to 1200° C.—hold for 5 minutes—roll slightly.
(b) Heat to 1250° C.—hold for 5 minutes—roll slightly.
(c) Repeat at 10° C. intervals to 1300° C. and accomplished most of the reduction in this step.

After the foregoing treatment, the density of the material was at least 97% of the maximum theoretical density obtainable by melting and solidifying the Ni+Al material. The material showed a discontinuous polycrystalline, fiber-like micro-structure such as is illustrated in FIGS. 3 and 4 and the material was predominantly in the form of a solid solution of aluminum in nickel together with a fibered $Ni_3Al$ phase being present as a dispersed precipitate.

The foregoing procedure was repeated for Ni+Al mixtures containing 5%, 6%, 8%, 11%, and 13% Al. Additionally, the foregoing procedure was also repeated for mixtures of 10% Al, 7% Fe, balance Ni and 10% Al, 4% Mo, balance Ni.

Materials of the present invention, prepared in the manner of the foregoing example were tested for mechanical strength in an air atmosphere and compared with samples of PA-1 material which is widely considered to be the best commercially available nickel base composite material. The PA-1 samples were taken from 1 mm. sheet obtained commercially and cold-rolled to 0.3 to 0.4 mm. Some of the PA samples were annealed at 1100° C. for 1 hour before testing. All test specimens including those of the present invention were 0.3 to 0.4 mm. thick and the gauge length employed was 6 mm. The tests were made using an Instron testing machine with a cross-head speed of 0.005 cm. per min. The strain rate was 0.0083 cm./cm. per minute.

The results of the tests are shown in FIGS. 5 and 6 and as can be seen from FIG. 5, the materials of the present invention exhibit superior strength over the range from room temperature to 1000° C. With reference to FIGS. 6(a) and 6(b) it can be further seen that the ductility of the material of the present invention increases with temperature whereas the ductility of the PA-1 material decreases.

In addition to the foregoing advantages, material of the present invention also exhibits excellent oxidation resistance. For example, a sample of the material of this invention (Ni+10% Al) heated in a stream of air at 1100° C. for 10 hours, showed a weight gain of only 1 mg./cm.$^2$ and material similarly treated at 990° C. for 25 hours showed a weight gain of only 0.2 mg./cm.$^2$. This is comparable to weight gains of 1.6 and 0.6 mg./cm.$^2$, respectively, exhibited by one of the best presently available high temperature materials, Haynes[1] alloy No. 188.

In a further embodiment of this invention by which enhanced dispersion strengthening is obtained the nickel powder constituent contains a minor proportion of combined oxygen e.g. from about 0.1% to about 3%. Elemental nickel powder can be heated at moderate temperatures, e.g. from about 300 to 450° C. for a period of time sufficient to obtain this result. Using this material, with elemental aluminum powder, and treating the mixture in the same manner as aforedescribed, uniformly dispersed and discrete rows of Al$_2$O$_3$ particles are obtained in the product material at the sites of the initial elemental aluminum fibrous material. The Al$_2$O$_3$ phase is composed of mostly sub-micron size particles and this additional dispersion of inert particles provides a further increase in strength, especially at the high temperatures.

Also, in the present invention, it has been found that the following materials can be blended with the starting nickel and aluminum materials, in the form of finely divided powders, preferably on the order of a few microns, to provide further improved high temperature strength, ductility and oxidation resistance:

[1] Trademark of Union Carbide Corporation.

|    | Percent   |
|----|-----------|
| Fe | Up to 25  |
| W  | Up to 15  |
| Mo | Up to 15  |
| Zr | Up to 4   |
| Ti | Up to 10  |
| Sn | Up to 6   |
| Si | Up to 1.5 |
| Ta | Up to 10  |
| Nb | Up to 5   |
| Y  | Up to 3   |
| Re | Up to 5   |
| La | Up to 3   |
| Cr | Up to 20  |
| Zn | Up to 6   |

What is claimed is:

1. A method for producing a composite article which comprises:
   (i) blending finely divided elemental nickel powder with from about 2 to about 20% by weight of finely divided elemental aluminum powder;
   (ii) subjecting the thus blended nickel and aluminum powders to a compacting and deforming pressure sufficient to produce a coherent compact comprising particles of elemental nickel and elemental aluminum, substantially all of which particles have been elongated as a result of the deforming pressure;
   (iii) heating the thus formed compact to a temperature sufficient to initiate a self-sustaining exothermic reaction throughout substantially the entire compact to provide a reaction product predominantly in the form of interlocked polycrystalline fiber-like material;
   (iv) and hot-working the thus treated compact at a temperature in the range of about 900 to 1350° C. to produce a material, the predominant proportion of which is in the form of discontinuous, fiber-like, interlocked polycrystalline structure containing a solid solution of aluminum in nickel and Ni$_3$Al, a portion of the Ni$_3$Al being present as a dispersed precipitate.

References Cited

UNITED STATES PATENTS

| 2,877,113 | 3/1959 | Fitzer | 75—211 |
| 2,936,255 | 5/1960 | Fitzer | 75—224 |
| 3,021,211 | 2/1962 | Flinn | 148—12.7 X |
| 3,366,515 | 1/1968 | Fraser et al. | 148—11.5 F |
| 3,554,740 | 1/1971 | Williams et al. | 29—182.5 X |

JOHN F. CAMPBELL, Primary Examiner

D. C. REILEY, Assistant Examier

U.S. Cl. X.R.

29—420, DIG. 21, DIG. 31, 182.5; 75—200; 148—12.7, 126